US009958048B2

(12) United States Patent
Osborn

(10) Patent No.: US 9,958,048 B2
(45) Date of Patent: May 1, 2018

(54) TRANSFER CASE

(71) Applicant: JAGUAR LAND ROVER LIMITED, Warwickshire (GB)

(72) Inventor: Russell Osborn, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 217 days.

(21) Appl. No.: 14/919,122

(22) Filed: Oct. 21, 2015

(65) Prior Publication Data

US 2016/0116046 A1 Apr. 28, 2016

(30) Foreign Application Priority Data

Oct. 23, 2014 (GB) .................................. 1418827.0

(51) Int. Cl.
*F16H 48/10* (2012.01)
*F16H 48/22* (2006.01)
*B60K 17/346* (2006.01)
*F16H 3/54* (2006.01)

(52) U.S. Cl.
CPC ........... *F16H 48/10* (2013.01); *B60K 17/346* (2013.01); *F16H 48/22* (2013.01); *F16H 3/54* (2013.01); *F16H 2200/0034* (2013.01); *F16H 2200/2005* (2013.01); *F16H 2200/2035* (2013.01)

(58) Field of Classification Search
CPC .. F16H 48/10; F16H 48/22; F16H 2200/2035; F16H 2200/2005; F16H 2200/0034; F16H 3/54; D60K 17/346
See application file for complete search history.

(56) References Cited

U.S. PATENT DOCUMENTS

| 5,655,983 | A | * | 8/1997 | Dick | B60K 17/3505 418/32 |
| 5,702,319 | A | * | 12/1997 | Baxter, Jr. | B60K 17/3465 418/32 |
| 9,605,753 | B2 | * | 3/2017 | Pritchard | F16H 61/18 |
| 2003/0144109 | A1 | | 7/2003 | Gradu | |
| 2005/0277509 | A1 | * | 12/2005 | Showalter | B60K 17/3467 475/210 |
| 2006/0046888 | A1 | * | 3/2006 | Puiu | B60K 17/16 475/151 |
| 2006/0166775 | A1 | | 7/2006 | Gradu | |
| 2006/0199697 | A1 | * | 9/2006 | Kirkwood | B60K 17/3467 477/5 |
| 2007/0180940 | A1 | * | 8/2007 | Mizon | B60K 17/3467 74/330 |

OTHER PUBLICATIONS

Combined Search and Examination Report under Sections 17 and 18(3) for Application No. GB1418827.0 dated Apr. 13, 2015.

* cited by examiner

*Primary Examiner* — David J Hlavka
(74) *Attorney, Agent, or Firm* — Carlson, Gaskey & Olds

(57) ABSTRACT

A vehicle transfer case has a first input drive means, a first output drive means and a second output drive means. A first epicyclic gear set is provided in the transfer case. The first epicyclic gear set includes a first sun gear, a plurality of first planetary gears, a first planet carrier and a first ring gear. A first clutch means is configured to control the first epicyclic gear set. The first output drive means is drivingly coupled to the first input drive means; and the first clutch means selectively drivingly couples the second output drive means to the first input drive means.

18 Claims, 10 Drawing Sheets

TRANSFER CASE

TECHNICAL FIELD

The present disclosure relates to a transfer case. Aspects of the invention relate to a transfer case, to a vehicle driveline and to a vehicle.

BACKGROUND

It is known to provide a four wheel drive vehicle with a means of disconnecting two of the driving wheels when the vehicle is driven on less challenging terrain, for example "on road". A schematic representation of a driveline 1 for such a vehicle is shown in FIG. 1A. The driveline 1 is connected to an internal combustion engine 3 arranged in a longitudinal (North South) configuration. An output shaft of the internal combustion engine 3 is connected to a gearbox 5. The disconnect means is in the form of a transfer case 7 configured to split torque between a main drive (propeller) shaft 9 and an auxiliary drive (propeller) shaft 11. The main drive shaft 9 transmits torque to a pair of rear wheels $W_R$; and the auxiliary drive shaft 11 transmits torque to a pair of front wheels $W_F$. The transfer case 7 is operable to split the torque delivery between the main drive shaft 9 and to the auxiliary drive shaft 11.

As shown schematically in FIG. 1B, the transfer case 7 comprise an input drive means 13, a first output drive means 15 and a second output drive means 17. The input drive means 13 is connected to an output shaft 19 of the gearbox 5. The first output drive means 15 is connected to the main drive shaft 9; and the second output drive means 17 is connected to the auxiliary drive shaft 11. The transfer case 7 further comprises transfer drive means 21. The transfer drive means 21 can comprise a drive belt or a drive chain. In alternate arrangements, the transfer drive means 21 can comprise a gear train.

The transfer case 7 comprises drive selector means for selectively engaging the transfer drive means 21 to drivingly connect the second output drive means 17 to the input drive means 13. The drive selector means can, for example, comprise a clutch mechanism 23 operable selectively to engage/disengage the transfer drive means 21. When the clutch mechanism 23 is engaged, the transfer drive means 21 drivingly connects the second output drive means 17 to the input drive means 13 The clutch mechanism 23 could be operated manually or in dependence on an electronic control signal from a transfer case control unit (not shown). The drive selector means can provide "on-demand" torque delivery, enabling the vehicle driveline 1 selectively to operate in either a two wheel drive mode (when the transfer drive means 21 is disconnected from the input drive means 13) or a four wheel drive mode (when the transfer drive means 21 is connected to the input drive means 13). A transfer case 1 incorporating drive selector means can be referred to as an on-demand transfer case. An alternative type of transfer case utilises a two-state clutch, such as a dog clutch, to connect or disconnect the transfer drive means 21 from the input drive means 13; this is referred to as a part-time transfer case.

A limitation of known on-demand transfer cases is the need to use a high torque clutch to transfer high torque loads. However, a high torque clutch typically has a high drag when operating under high delta speeds and it may not be possible to realise a highly efficient disconnect system. This can prove problematic for motor vehicles requiring a transfer case capable of withstanding high torque loads.

An alternative to providing a drive selector means is to provide a differential (not shown) in the transfer case 7. The differential engages the transfer drive means 21 in order to transmit torque from the input drive means 13 to the second output drive means 17. In use, the differential distributes drive between the front wheels $W_F$ and the rear wheels $W_R$. The differential can additionally be in the form of a limited slip differential of which there are various different types. The operation of the differential cannot readily be controlled independently, so it is not possible selectively to engage/disengage the transfer drive means 21.

At least in certain embodiments, the present invention seeks to overcome or ameliorate at least some of the shortcomings and problems associated with the prior art arrangement described herein.

SUMMARY OF THE INVENTION

Aspects of the present invention relate to a transfer case, to a vehicle driveline and to a vehicle.

According to an aspect of the present invention there is provided a transfer case for a vehicle driveline, the transfer case comprising:
  a first input drive means;
  a first output drive means;
  a second output drive means;
  a first epicyclic gear set comprising a first sun gear, a plurality of first planetary gears, a first planet carrier, and a first ring gear; and
  a first clutch means configured to control the first epicyclic gear set;
  wherein the first output drive means is continuously drivingly coupled to the first input drive means; and the first clutch means selectively drivingly couples the second output drive means to the first input drive means. In one non-limiting embodiment, the structure or transmission component comprises a transfer case.

The first clutch may be operable to control the first epicyclic gear set selectively to drivingly de-couple the second output drive means from the first input drive means. It will be appreciated, therefore, that the second output drive is not permanently driven by the first input drive means. Thus, the transfer case can be referred to as a non-permanent transfer case and can, for example, be in the form of an on-demand transfer case or a part-time transfer case.

In use, the first clutch means is configured to control the first epicyclic gear set by selectively applying a torque reaction to one or more elements of the first epicyclic gear set. In particular, the first clutch means can apply a torque reaction to one or more of the following set: the first sun gear, the first planet carrier and the first ring gear. The first clutch means can be operated to selectively drivingly couple the second output drive means to the first input drive means; and to selectively drivingly de-couple the second output drive means from the first input drive means. The term "drivingly coupled" is used to refer to the operational configuration in which torque is transmitted from the first drive input means to the second output drive means (in other words, the second output drive means is connected to the first drive input means). Conversely, the term "drivingly de-coupled" is used to refer to the operational configuration in which torque is not transmitted from the first drive input means to the second output drive means (in other words, the second output drive means is disconnected from the first drive input means). It will be appreciated that the first sun gear, the first planetary gears and the first ring gear can remain engaged with each other irrespective of the operating state of the first clutch means.

At least in certain embodiments, the first epicyclic gear set allows leverage of the torque of a small clutch to achieve high on-demand torque output. The use of a smaller clutch can have a lower drag when disconnected. Also, a smaller clutch can reduce mass, cost and packaging requirements. At least in certain embodiments the operational speed of the clutch is increased and this can provide improved oil expulsion which can reduce drag torque. Alternatively, or in addition, the delta speed across the clutch can be reduced and this can reduce drag power loss.

The first output drive means can comprise a first assembly for coupling to a first drive shaft. The second output drive means can comprise a second assembly for coupling to a second drive shaft. The transfer case can be configured to select two wheel drive or four wheel drive for a motor vehicle.

The first epicyclic gear set can have a gear ratio in the range 1.1 to 10, and more particularly in the range 1.5 to 6. The gear ratio of the ring gear to the first sun gear can be 1.93. It will be understood that other gear ratios can also be employed.

When the first clutch means is engaged, the first epicyclic gear set can drivingly couple the second output shaft to the input shaft. When the first clutch means is dis-engaged, the first epicyclic gear set can drivingly de-couple the second output shaft from the input shaft.

The first clutch means can be configured to selectively engage the first sun gear or the first planet carrier or the first ring gear to prevent rotation. The first clutch means can couple the first sun gear or the first planetary gear or the first ring gear to a fixed ground to prevent rotation. The fixed ground can, for example, be a housing of the transfer case.

The first clutch means can comprise a first clutch mechanism. The first clutch means can comprise a friction clutch. The first clutch means can comprise a wet clutch. The wet clutch can be a multi-plate clutch. The wet clutch can be controlled electronically.

The first clutch means can be configured to: (a) drivingly couple the first sun gear to the first planet carrier; or (b) drivingly couple the first sun gear to the first ring gear; or (c) drivingly couple the first ring gear to the first planet carrier.

In one embodiment, the first planet carrier is coupled to the first input drive means and the first ring gear is coupled to the second output drive means, wherein the first clutch means is configured to releasably engage the first sun gear. When engaged, the first clutch means can prevent rotation of the first sun gear.

In a further embodiment, the first planet carrier is coupled to the second output drive means and the first ring gear is coupled to the first input drive means, wherein the first clutch means is configured to releasably engage the first sun gear. When engaged, the first clutch means can prevent rotation of the first sun gear.

In a still further embodiment, the first sun gear is coupled to the first input drive means and the first planet carrier is coupled to the second output drive means, wherein the first clutch means is configured to releasably engage the first ring gear. The first clutch means can engage to prevent rotation of the first ring gear.

In a further embodiment, the first planet carrier is coupled to the first input drive means and the first ring gear is coupled to the second output drive means, wherein the first clutch means is configured to releasably couple the first sun gear to the first planet carrier. The first clutch means can engage to prevent rotation of the first sun gear relative to the first planet carrier.

In a still further embodiment, the first planet carrier is coupled to the first input drive means and the first ring gear is coupled to the second output drive means, wherein the first clutch means is configured to releasably couple the first sun gear to the first ring gear. The first clutch means can engage to prevent rotation of the first sun gear relative to the first ring carrier.

In a yet further embodiment, the sun gear is coupled to the first input drive means and the planet carrier is coupled to the second output drive means, wherein the first clutch means is configured to releasably couple the first ring gear to the first input drive means. The first clutch means can engage to prevent rotation of the first ring gear relative to the first input drive means.

The transfer case can comprise a second epicyclic gear set comprising a second sun gear, a plurality of second planetary gears, a second planet carrier, and a second ring gear. A second clutch means can be provided for controlling operation of the second epicyclic gear set to selectively engage either a high range or a low range.

The second sun gear can be coupled to the first input drive means. The second planet carrier can be coupled to the first planet carrier; and the second clutch means configured to selectively couple the second ring gear to either the second planet carrier or to a fixed ground. The rotation of the second ring gear is prevented when it is coupled to the fixed ground. The first and second planetary gears can be mounted on common pinion pins.

According to a further aspect of the present invention there is provided a vehicle driveline comprising a transfer case as described herein. The first output drive means can be connected to a first drive shaft and the second output drive means can be connected to a second drive shaft. The first drive shaft can be a main drive shaft and the second drive shaft can be an auxiliary drive shaft.

The vehicle driveline can comprise a driveline disconnect for disconnecting a portion of the vehicle driveline, for example the first drive shaft or the second drive shaft. The driveline disconnect can comprise a releasable torque transmitting coupling, for example a clutch, such as a multi-plate clutch or a dog clutch. In use, the driveline disconnect can operate in conjunction with the first clutch means selectively to disconnect the portion of the vehicle driveline. An electronic control unit can be configured to control operation of the driveline disconnect and the first clutch means.

The driveline disconnect can be operable selectively to disconnect a drive shaft coupled to the second output drive means. For example, the driveline disconnect can be configured to disconnect the auxiliary drive shaft coupled to the second output drive means. The driveline disconnect means can comprise clutch means. The clutch means of the driveline disconnect can be in the form of a clutch mechanism, such as a dog clutch or a multi-plate clutch.

According to a still further aspect of the present invention there is provided a vehicle comprising a transfer case as described herein. The vehicle can comprise a torque-generating apparatus, such as an internal combustion engine. The internal combustion engine can be arranged in a longitudinal configuration or in a transverse configuration. The vehicle can also comprise at least one front wheel and at least one rear wheel. The transfer case can be a non-permanent transfer case, such as an on-demand transfer case or a part-time transfer case. The motor vehicle can adopt a longitudinal on-demand four-wheel-drive architecture.

The first output drive means can be configured to drivingly couple the torque-generating apparatus to the at least one front wheel or to the at least one rear wheel; and the first clutch means can be configured selectively to drivingly couple the other of said at least one front wheel and said at least one rear wheel to the torque-generating apparatus.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figures 1A, 1B:
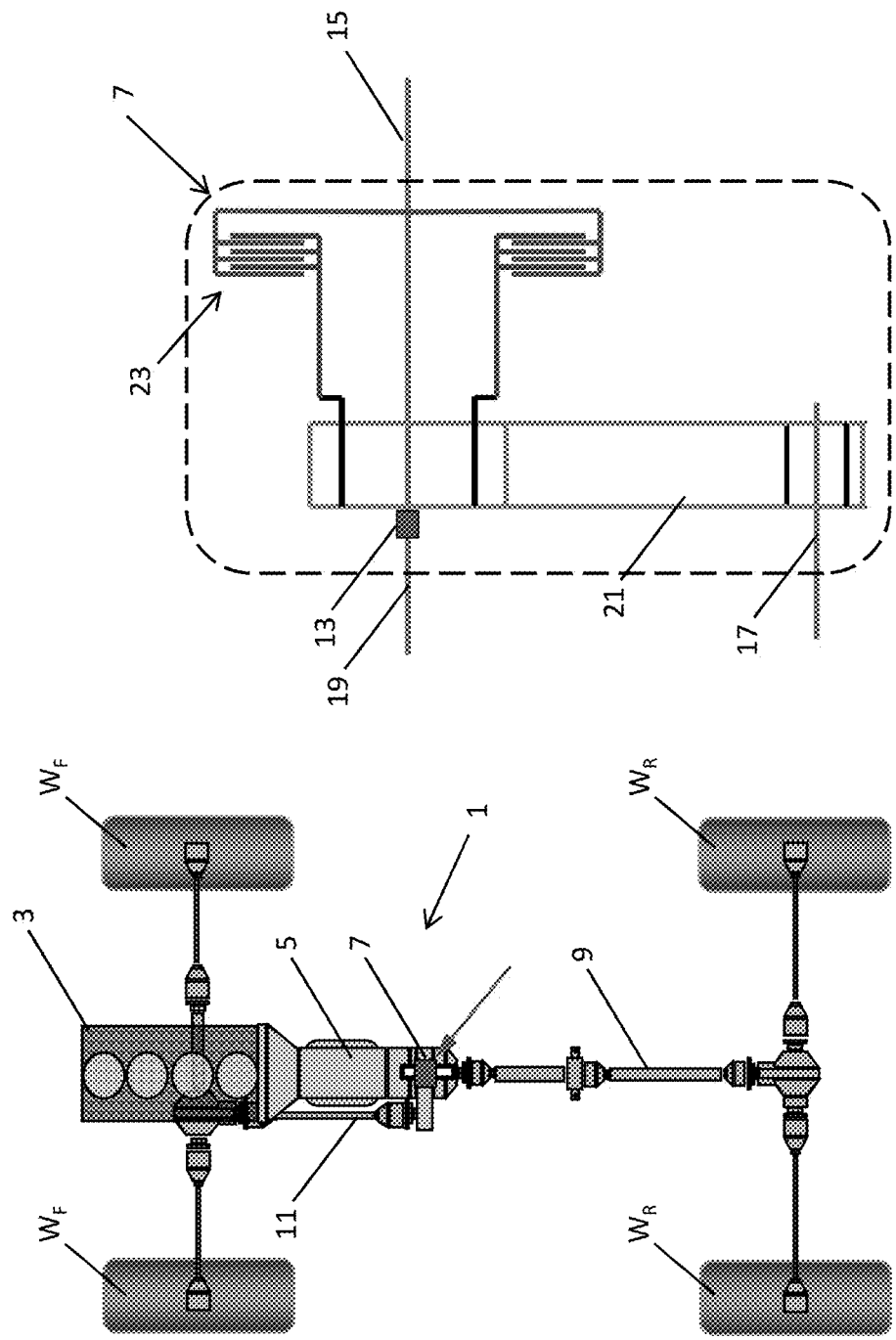
FIG. 1A is a schematic layout of a driveline for a motor vehicle incorporating an transfer case.
FIG. 1B is a schematic layout of a known transfer case for use in the driveline shown in FIG. 1A.
Figure 2:
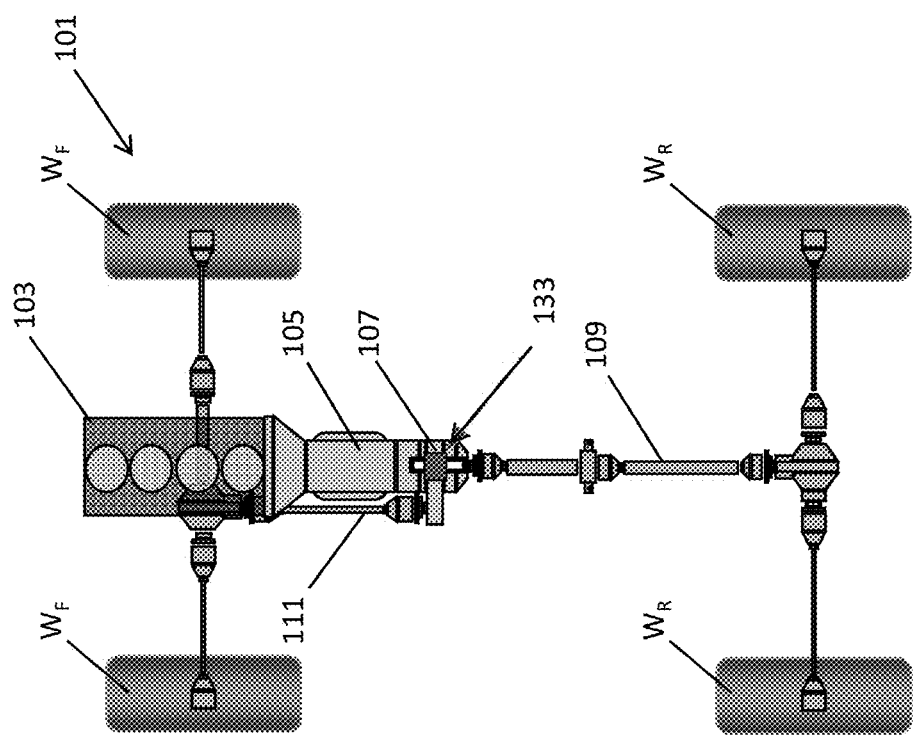
FIG. 2 is a schematic layout of a vehicle driveline incorporating an transfer case in accordance with an embodiment of the present invention.

A schematic representation of a driveline 101 for a four wheel drive vehicle V is shown in FIG. 2. The driveline 101 is connected to an internal combustion engine 103 arranged in a longitudinal (North South) configuration. An output shaft of the internal combustion engine 103 is connected to a gearbox 105 and the output of the gearbox 105 is connected to a transfer case 107 in accordance with an embodiment of the present invention.

The transfer case 107 is configured to be continuously drivingly coupled to a main drive (propeller) shaft 109 and selectively drivingly coupled to an auxiliary drive (propeller) shaft 111. Thus, the transfer case 107 is an on-demand transfer case operatively configured to continuously transmit torque to the main drive draft 109 and to selectively transmit torque to the auxiliary drive shaft 111. The main drive shaft 109 is adapted to transmit torque to a set of rear wheels $W_R$ of the vehicle V; and the auxiliary drive shaft 111 is adapted to transmit torque to a set of front wheels $W_F$ of the vehicle V. The transfer case 107 can thereby split the torque transmitted to the front and rear wheels $W_F$, $W_R$ of the vehicle V.

Figure 3:
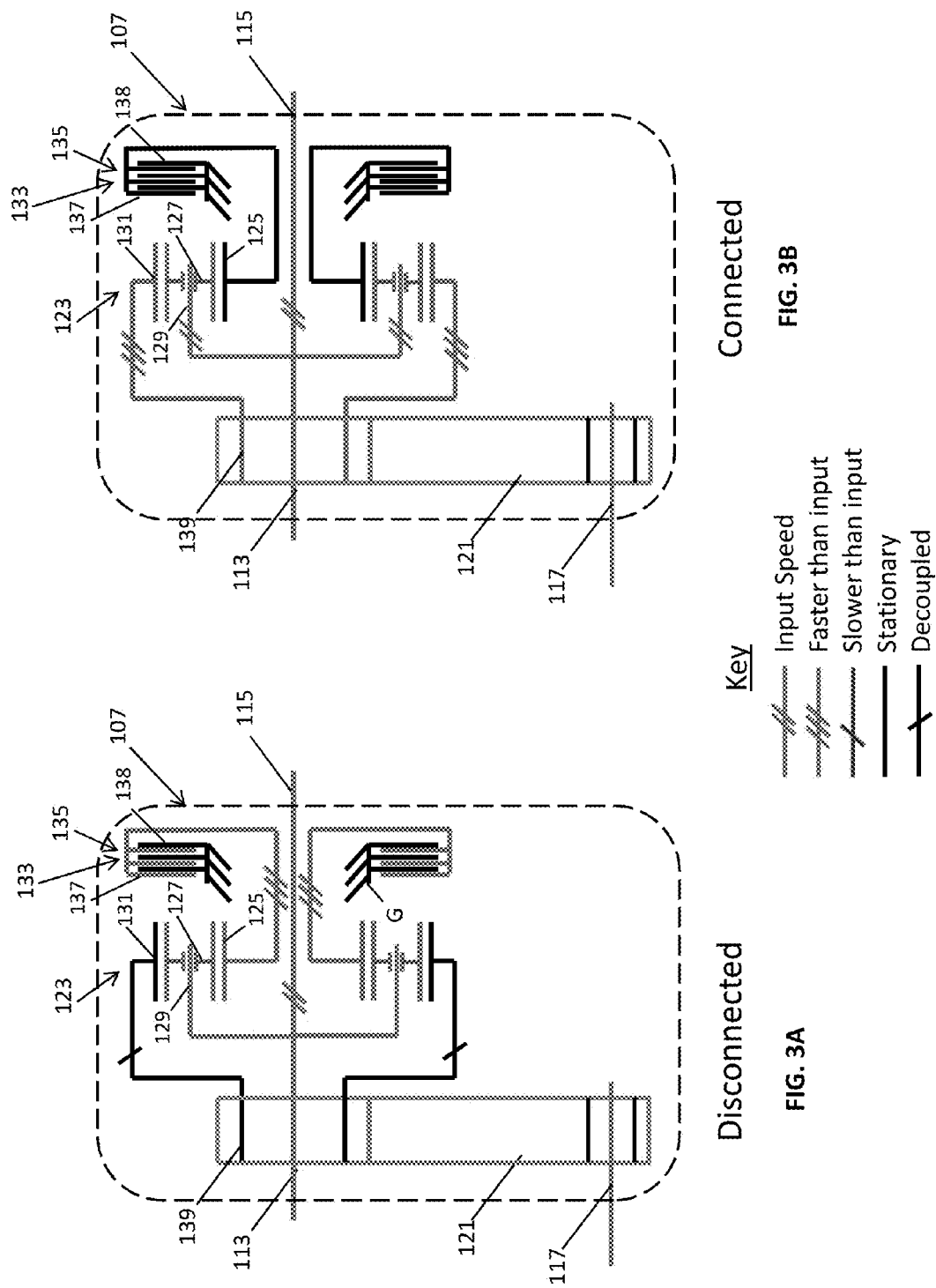
FIGS. 3A and 3B are schematic representations of a transfer case in accordance with an embodiment of the present invention in respective disconnected and connected configurations.

The transfer case 107 in accordance with an embodiment of the present invention is shown schematically in FIGS. 3A and 3B. The transfer case 107 comprises an input drive means in the form of an input drive shaft 113, a first output drive means in the form of a first output drive assembly 115 and a second output drive means in the form of a second output drive assembly 117. The input drive shaft 113 is continuously drivingly coupled to an output shaft (not shown) from the gearbox 105. The first output drive assembly 115 is connected to the main drive shaft 109; and the second output drive assembly 117 is connected to the auxiliary drive shaft 111. The transfer case 107 also comprises a transfer drive means in the form of a transfer drive chain 121 for driving the second output drive assembly 117.

The transfer case 107 comprises a first epicyclic gear set 123 for selectively drivingly coupling the second output drive assembly 117 to the input drive shaft 113. In a first operational configuration the transfer drive chain 121 is drivingly coupled to the input drive shaft 113; and in a second operational configuration the transfer drive chain 121 is drivingly de-coupled from the input drive shaft 113. The first epicyclic gear set 123 comprises a first sun gear 125, a plurality of first planetary gears 127, a first planet carrier 129, and a first ring gear 131. The first sun gear 125 meshes with the first planetary gears 127 which are each arranged to mesh with the first ring gear 131. The first planet carrier 129 is rotatably mounted and carries the first planetary gears 127. The gear ratio (R/S) of the first ring gear 131 to the first sun gear 125 is 1.93 in the present embodiment. A first clutch means in the form of a multi-plate clutch 133 is provided to control operation of the first epicyclic gear set 123. The multi-plate clutch 133 is a wet clutch including a clutch pack 135 comprising a plurality of outer plates 137 interspersed between inner plates 138. The outer plates 137 and/or the inner plates 138 comprise a friction material. The outer plates 137 are connected to a rotatable input member. The inner plates 138 are connected to a fixed ground G and are fixed in position (i.e. are non-rotatable). When the multi-plate clutch 133 is disengaged, the outer plates 137 are rotatable relative to the inner plates 138. Conversely, when the multi-plate clutch 133 is engaged, friction forces between the outer plates 137 and the inner plates 138 prevent rotation of the outer plates 137. The multi-plate clutch 133 is operated in dependence on a control signal from a transfer case control unit (not shown), for example in dependence on a detected slip condition or a driver request. By selectively controlling the engagement and disengagement of the multi-plate clutch 133, the transfer drive chain 121 can be connected to, or disconnected from the input drive shaft 113.

The transfer case 107 can thereby selectively drivingly couple the input drive shaft 113 to the second output drive assembly 117 to provide "on-demand" torque delivery to the front wheels $W_F$ of the vehicle V. It will be appreciated therefore that the driveline 101 can selectively operate in either a two wheel drive mode (when the transfer drive chain 121 is drivingly de-coupled) or a four wheel drive mode (when the transfer drive chain 121 is drivingly coupled).

In the present embodiment the first sun gear 125 is connected to the outer plates 137 in the clutch pack 135. The rotation of the first sun gear 125 is controllable by selectively engaging/disengaging the multi-plate clutch 133. When the multi-plate clutch 133 is engaged, rotation of the first sun gear 125 is prevented. The input drive shaft 113 is continuously drivingly coupled to the first planet carrier 129 such that, in use, the first planet carrier 129 rotates at the same speed as the input drive shaft 113. The first ring gear 131 is continuously drivingly coupled to a transfer sprocket 139 arranged to drive the drive chain 121.

The operation of the transfer case 107 will now be described with reference to FIGS. 3A and 3B. As shown in FIG. 3A, when the multi-plate clutch 133 is disengaged, the outer plates 137 in the clutch pack 135 rotate relative to the inner plates 138 thereby allowing the sun gear 125 to rotate. When the multi-plate clutch 133 is disengaged, the first ring gear 131 is drivingly de-coupled from the input drive shaft 113. The first planet carrier 129 drivingly rotates the sun gear 125 at a rotational speed higher than the input drive shaft 113. Thus, the outer plates 137 of the clutch pack 135 rotate faster than the input drive shaft 113, helping to expel lubricant and, therefore, to lower drag torque of the multi-plate clutch 133. As shown in FIG. 3B, when the multi-plate clutch 133 is engaged, rotation of the outer plates 137 relative to the clutch pressure plate 139 in the clutch pack 135 is inhibited and the first sun gear 125 is prevented from rotating. The first planet carrier 129 rotates together with the input drive shaft 113. The first ring gear 131 functions as an output from the first epicyclic gear set 123.

The direction of output path of the first ring gear 131 matches that of the first sun gear 125 in the present embodiment. The first ring gear 131 rotates faster than the input drive shaft 113. In the present embodiment the first ring gear 131 rotates 1.52 times faster than the input drive shaft 131 $((1+R/S)/(R/S))$. It will be appreciated that a speed matching apparatus (not shown) is required to match the rotational speeds of the first output drive assembly 115 and the second output drive assembly 117. The speed matching apparatus can be provided in the transfer case 107, for example incorporated into the second output drive assembly 117. Alternatively, the speed matching apparatus can be provided in the driveline remote from the transfer case 107. The speed matching apparatus can comprise one or more gears, for example.

The transfer case 107 has been described with reference to the driveline 101 shown in FIG. 2. In this arrangement, the auxiliary drive shaft 111 remains coupled to the second output drive assembly 117 and to the front wheels $W_F$. It will be appreciated that the transfer case 107 can also be used in combination with a driveline disconnect means to selectively disconnect the auxiliary drive shaft 111. The driveline disconnect means can, for example, be in the form of a clutch mechanism, such as a dog clutch or a multi-plate clutch, disposed on a front axle. The driveline disconnect can be operated in conjunction with the multi-plate clutch 133 to disconnect the auxiliary drive shaft 111. In this arrangement, when the multi-plate clutch 133 is disengaged and the auxiliary drive shaft 111 is disconnected, the first ring gear 131 comes to rest. This arrangement can help to reduce driveline losses when the second output drive assembly 117 is drivingly de-coupled from the input drive shaft 113. The inclusion of a driveline disconnect is applicable to each embodiment described herein.

Figure 4:
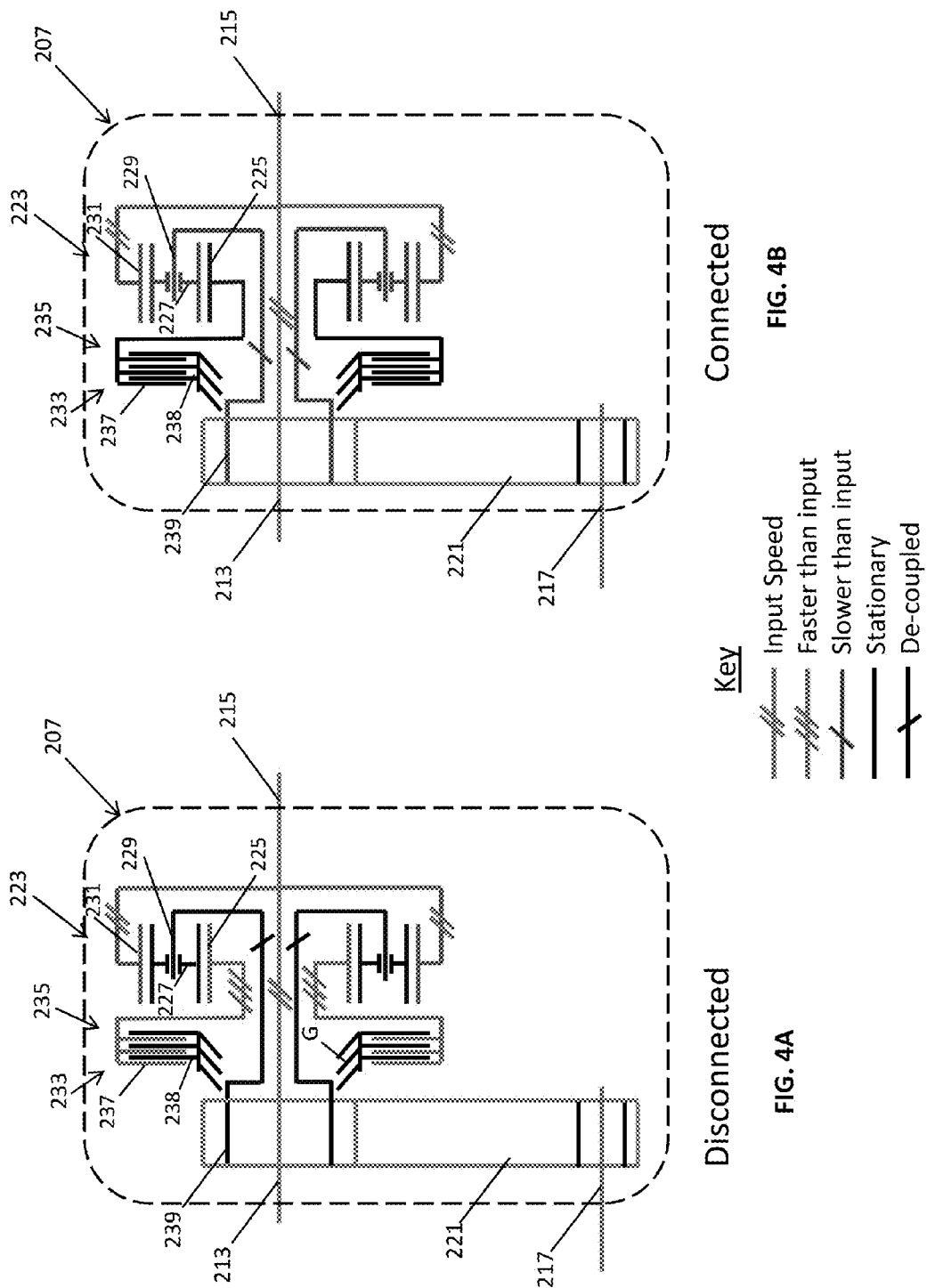
FIGS. 4A and 4B are schematic representations of a transfer case in accordance with a further embodiment of the present invention in respective disconnected and connected configurations.

A further embodiment of a transfer case 207 is shown schematically in FIGS. 4A and 4B. Like reference numerals are used for like components, but increased by 100 for the sake of clarity.

The transfer case 207 comprises a first epicyclic gear set 223 for selectively drivingly coupling a second output drive assembly 217 to an input drive shaft 213. The first epicyclic gear set 223 comprises a first sun gear 225, a plurality of first planetary gears 227, a first planet carrier 229, and a first ring gear 231. The first sun gear 225 meshes with the first planetary gears 227 which are each arranged to mesh with the first ring gear 231. The first planet carrier 229 is rotatably mounted and carries the first planetary gears 227. The gear ratio (R/S) of the first ring gear 231 to the first sun gear 225 is 1.93 in the present embodiment. A first clutch means in the form of a multi-plate clutch 233 is provided to control operation of the first epicyclic gear set 223. The multi-plate clutch 233 is a wet clutch including a clutch pack 235 comprising a plurality of outer plates 237 interspersed between inner plates 238. The outer plates 237 and/or the inner plates 238 comprise a friction material. The outer plates 237 are connected to a rotatable input member. The inner plates 238 are connected to a fixed ground G and are fixed in position (i.e. are non-rotatable). The operation of the multi-plate clutch 233 is unchanged from that of the multi-plate clutch 133 described herein.

In the present embodiment the first sun gear 225 is connected to the outer plates 237 in the clutch pack 235. The rotation of the first sun gear 225 is controllable by selectively engaging/disengaging the multi-plate clutch 233. When the multi-plate clutch 233 is engaged, rotation of the first sun gear 225 is prevented. The input drive shaft 213 is continuously drivingly coupled to the first ring gear 231 such that, in use, the first ring gear 231 rotates at the same speed as the input drive shaft 213. The first planet carrier 229 is continuously drivingly coupled to a transfer sprocket 239 arranged to drive the drive chain 221. When the multi-plate clutch 233 is dis-engaged, the outer plates 237 of the clutch pack 235 rotate faster than the input drive shaft 213, helping to expel lubricant and, therefore, to lower drag torque of the multi-plate clutch 233.

The operation of the transfer case 207 will now be described with reference to FIGS. 4A and 4B. As shown in FIG. 4A, when the multi-plate clutch 233 is disengaged, the outer plates 237 in the clutch pack 235 rotate relative to the inner plates 238 thereby allowing the first sun gear 225 to rotate. The first planet carrier 229 is drivingly de-coupled from the input drive shaft 213. The input drive shaft 213 drivingly rotates the first ring gear 231 which rotates the first planetary gears 227. The first sun gear 225 is rotated faster than the input drive shaft 213. As shown in FIG. 4B, when the multi-plate clutch 233 is engaged, rotation of the outer plates 237 relative to the inner plates 238 is inhibited and the first sun gear 225 is prevented from rotating. The first ring gear 231 rotates at the same speed as the input drive shaft 213. The first planet carrier 229 functions as an output from the first epicyclic gear set 223 and rotates at a lower speed than the input drive shaft 213. The direction of output path of the first ring gear 231 matches that of the first sun gear 225 in the present embodiment. In the present embodiment the first planet carrier 229 rotates at 0.66 times the speed of the input drive shaft 231 $((R/S)/(1+(R/S)))$. It will be appreciated that a speed matching apparatus (not shown) is required to match the rotational speeds of the first output drive assembly 215 and the second output drive assembly 217. The speed matching apparatus can be provided in the transfer case 207, for example incorporated into the second output drive assembly 217. Alternatively, the speed matching apparatus can be provided in the driveline remote from the transfer case 207. The speed matching apparatus can comprise one or more gears, for example.

Figure 5:
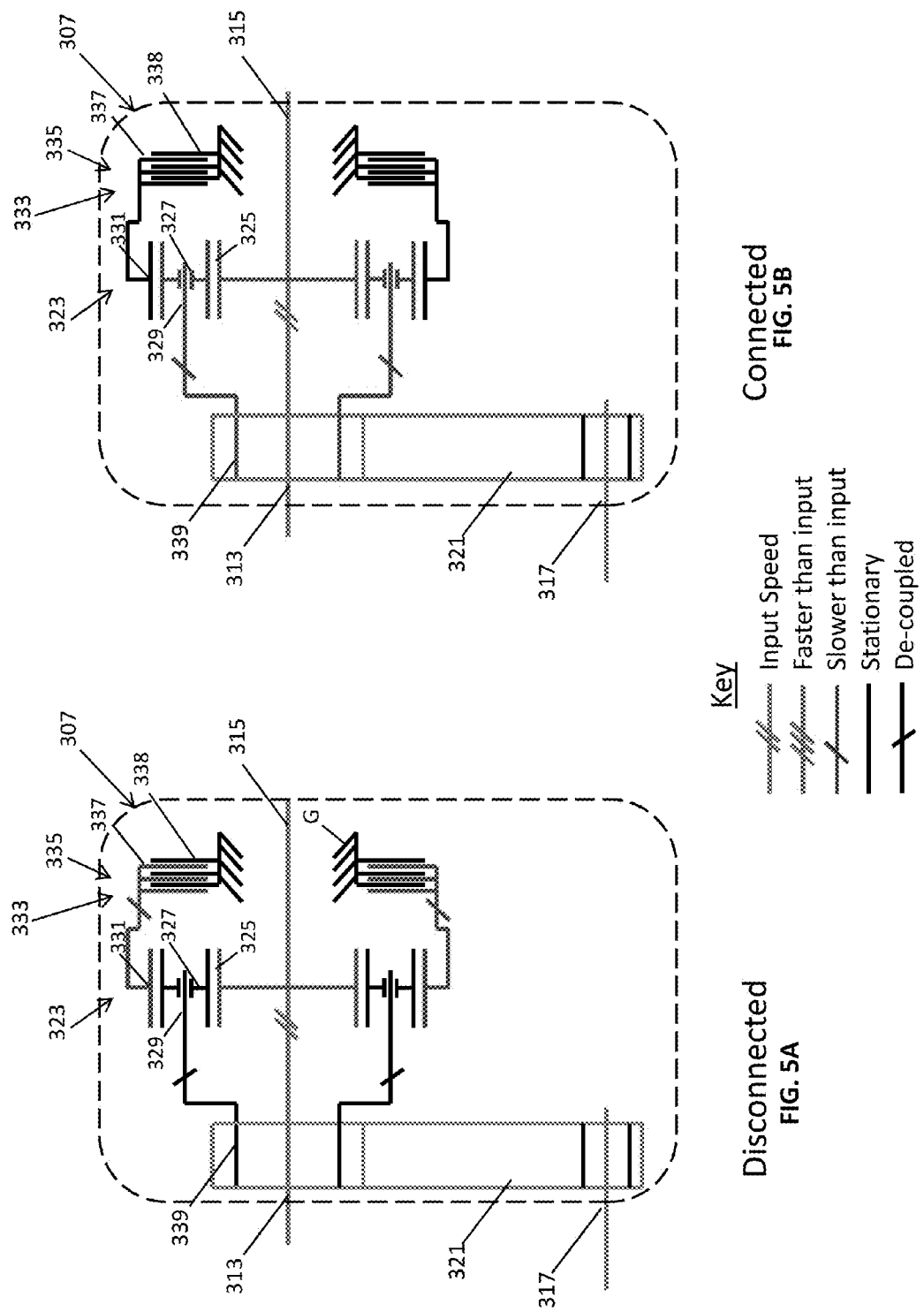
FIGS. 5A and 5B are schematic representations of a transfer case in accordance with a further embodiment of the present invention in respective disconnected and connected configurations.

A further embodiment of a transfer case 307 is shown schematically in FIGS. 5A and 5B. Like reference numerals are used for like components, but increased by 100 for the sake of clarity.

The transfer case 307 comprises a first epicyclic gear set 323 for selectively drivingly coupling a second output drive assembly 317 to an input drive shaft 313. The first epicyclic gear set 323 comprises a first sun gear 325, a plurality of first planetary gears 327, a first planet carrier 329, and a first ring gear 331. The first sun gear 325 meshes with the first planetary gears 327 which are each arranged to mesh with the first ring gear 331. The first planet carrier 329 is rotatably mounted and carries the first planetary gears 327. The gear ratio (R/S) of the first ring gear 331 to the first sun gear 325 is 1.93 in the present embodiment. A first clutch means in the form of a multi-plate clutch 333 is provided to control operation of the first epicyclic gear set 323. The multi-plate clutch 333 is a wet clutch including a clutch pack 335 comprising a plurality of outer plates 337 interspersed between inner plates 338. The outer plates 337 and/or the inner plates 338 comprise a friction material. The outer plates 337 are connected to a rotatable input member. The inner plates 338 are connected to a fixed ground G and are fixed in position (i.e. are non-rotatable). The operation of the multi-plate clutch 333 is unchanged from that of the multi-plate clutch 133 described herein.

In the present embodiment the first sun gear 325 is continuously drivingly coupled to the input drive shaft 313 such that, in use, the first sun gear 325 rotates at the same speed as the input drive shaft 313. The first planet carrier 329 is continuously drivingly coupled to a transfer sprocket 339 arranged to drive the drive chain 321. The first ring gear 331 is connected to the outer plates 337 in the clutch pack 335. The rotation of the first ring gear 331 is controllable by selectively engaging/disengaging the multi-plate clutch 333. When the multi-plate clutch 333 is engaged, rotation of the first ring gear 331 is prevented. When the multi-plate clutch 333 is dis-engaged, the outer plates 337 of the clutch pack 335 rotate slower than the input drive shaft 313, helping to reduce the speed difference (delta) across the multi-plate clutch 333 and, thereby, reducing drag power loss.

The operation of the transfer case 307 will now be described with reference to FIGS. 5A and 5B. As shown in FIG. 5A, when the multi-plate clutch 333 is disengaged, the outer plates 337 in the clutch pack 335 are free to rotate relative to the inner plates 338. The first sun gear 325 rotates at the same speed as the input drive shaft 313. The first planet carrier 329 is drivingly de-coupled from the input drive shaft 313 when the multi-plate clutch 333 is disengaged. The first sun gear 325 is rotated by the input drive shaft 313 which drivingly rotates the first planetary gears 327. The rotation of the first planetary gears 327 rotates the first ring gear 331 at a lower speed than that of the input drive shaft 313. As shown in FIG. 5B, when the multi-plate clutch 333 is engaged, rotation of the outer plates 337 relative to the inner plates 338 is inhibited and the first ring gear 331 is prevented from rotating. The first planet carrier 329 rotates at a lower speed than the input drive shaft 313.

The first planet carrier 329 is connected to the transfer sprocket 339 which drives the drive chain 321 and functions as an output from the first epicyclic gear set 323. The direction of output of the first planet carrier 329 matches that of the input drive shaft 313 in the present embodiment. In the present embodiment the first planet carrier 329 rotates at 0.34 times the speed of the input drive shaft 331 (1/(1+(R/S))). It will be appreciated that a speed matching apparatus (not shown) is required to match the rotational speeds of the first output drive assembly 315 and the second output drive assembly 317. The speed matching apparatus can be provided in the transfer case 307, for example incorporated into the second output drive assembly 317. Alternatively, the speed matching apparatus can be provided in the driveline remote from the transfer case 307. The speed matching apparatus can comprise one or more gears, for example.

Figure 6:
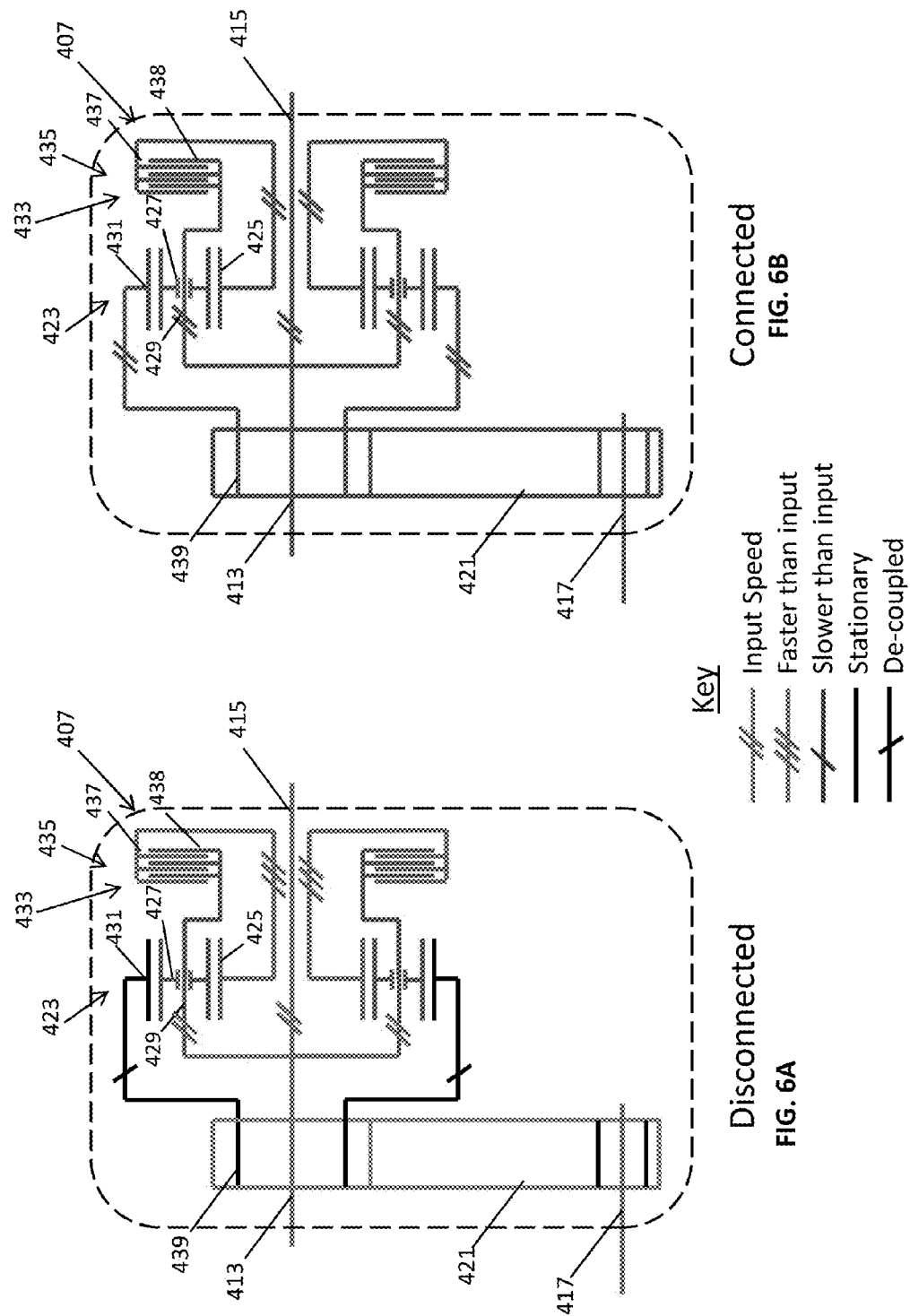
FIGS. 6A and 6B are schematic representations of a transfer case in accordance with a further embodiment of the present invention in respective disconnected and connected configurations.

A further embodiment of a transfer case 407 is shown schematically in FIGS. 6A and 6B. Like reference numerals are used for like components, but increased by 100 for the sake of clarity. The transfer case 407 comprises a first epicyclic gear set 423 for selectively drivingly coupling a second output drive assembly 417 to an input drive shaft 413. The first epicyclic gear set 423 comprises a first sun gear 425, a plurality of first planetary gears 427, a first planet carrier 429, and a first ring gear 431. The first sun gear 425 meshes with the first planetary gears 425 which are each arranged to mesh with the first ring gear 431. The first planet carrier 429 is rotatably mounted and carries the first planetary gears 427. The gear ratio (R/S) of the first ring gear 431 to the first sun gear 425 is 1.93 in the present embodiment. A first clutch means in the form of a multi-plate clutch 433 is provided to control operation of the first epicyclic gear set 423. The multi-plate clutch 433 is a wet clutch including a clutch pack 435 comprising a plurality of outer plates 437 interspersed between inner plates 438. The outer plates 437 and/or the inner plates 438 comprise a friction material. In the present embodiment, the outer plates 437 and the inner plates 438 are both rotatable. The outer plates 437 and the inner plates 438 are brought together when the multi-plate clutch 433 is engaged to prevent relative rotation therebetween.

In the present embodiment the first planet carrier 429 is continuously drivingly coupled to the input drive shaft 413 such that, in use, the first planet carrier 429 rotates at the same speed as the input drive shaft 413. The first ring gear 431 is continuously drivingly coupled to a transfer sprocket 439 arranged to drive the drive chain 421. The first sun gear 425 is connected to the outer plates 437 and the first planet carrier 429 is connected to the inner plates 438 in the clutch pack 435. The rotation of the first ring gear 431 is controllable by selectively engaging/disengaging the multi-plate clutch 433. When the multi-plate clutch 433 is engaged, the rotation of the first sun gear 425 relative to the first planet carrier 429 is prevented. Thus, the first sun gear 425, the first planet carrier 429 and the first ring gear 431 rotate together at the same speed when the multi-plate clutch 433 is engaged. When the multi-plate clutch 433 is dis-engaged, the outer plates 437 of the clutch pack 435 rotate faster than the input drive shaft 413, helping to expel lubricant and, therefore, to lower drag torque of the multi-plate clutch 433.

The operation of the transfer case 407 will now be described with reference to FIGS. 6A and 6B. As shown in FIG. 6A, when the multi-plate clutch 433 is disengaged, the outer plates 437 in the clutch pack 435 are free to rotate relative to the inner plates 438. The first planet carrier 429 rotates at the same speed as the input drive shaft 413. The first ring gear 431 is drivingly de-coupled from the input drive shaft 4413 when the multi-plate clutch 433 is disengaged. However, the first sun gear 425 is drivingly rotated by the first planetary gears 427 as the first planet carrier 429 rotates. The first sun gear 425 rotates at a higher speed than the input drive shaft 413. As shown in FIG. 6B, when the multi-plate clutch 433 is engaged, rotation of the outer plates 437 relative to the inner plates 438 is prevented. As outlined above, the first sun gear 425, the first planet carrier 429 and the first ring gear 431 rotate together at the same speed when the multi-plate clutch 433 is engaged. The first ring gear 431 is connected to the transfer sprocket 439 which drives the drive chain 221 and thereby functions as an output from the first epicyclic gear set 423. The direction of output of the first planet carrier 429 matches that of the input drive shaft 413 in the present embodiment. The first planet carrier 429 rotates at the same speed as the input drive shaft 413.

Figure 7:
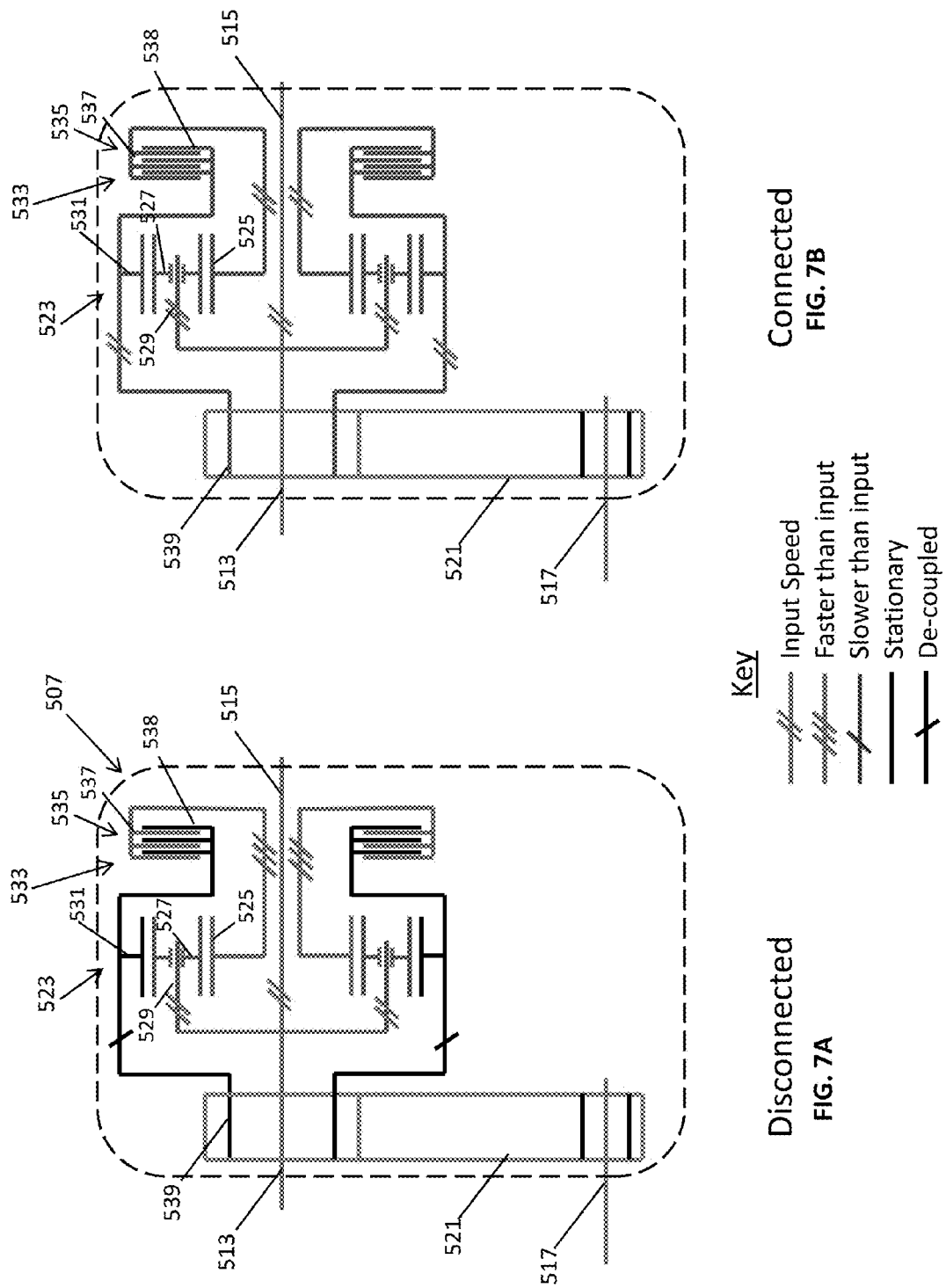
FIGS. 7A and 7B are schematic representations of a transfer case in accordance with a further embodiment of the present invention in respective disconnected and connected configurations.

A further embodiment of a transfer case 507 is shown schematically in FIGS. 7A and 7B. Like reference numerals are used for like components, but increased by 100 for the sake of clarity.

The transfer case 507 comprises a first epicyclic gear set 523 for selectively drivingly coupling a second output drive assembly 117 to an input drive shaft 513. The first epicyclic gear set 523 comprises a first sun gear 525, a plurality of first planetary gears 527, a first planet carrier 529, and a first ring gear 531. The first sun gear 525 meshes with the first planetary gears 527 which are each arranged to mesh with the first ring gear 531. The first planet carrier 529 is rotatably mounted and carries the first planetary gears 527. The gear ratio (R/S) of the first ring gear 531 to the first sun gear 525 is 1.93 in the present embodiment. A first clutch means in the form of a multi-plate clutch 533 is provided to control operation of the first epicyclic gear set 523. The multi-plate clutch 533 is a wet clutch including a clutch pack 535 comprising a plurality of outer plates 537 interspersed between inner plates 538. In the present embodiment, the outer plates 537 and the inner plates 538 are both rotatable. The outer plates 537 and/or the inner plates 538 comprise a friction material. The outer plates 537 and the inner plates 538 are brought together when the multi-plate clutch 533 is engaged to prevent relative rotation therebetween.

In the present embodiment the first planet carrier 529 is continuously drivingly coupled to the input drive shaft 513 such that, in use, the first planet carrier 529 rotates at the same speed as the input drive shaft 513. The first ring gear 531 is continuously drivingly coupled to a transfer sprocket 539 arranged to drive the drive chain 521. The first sun gear 525 is connected to the outer plates 537 and the first ring gear 531 is connected to the inner plates 538 in the clutch pack 535. The rotation of the first ring gear 531 is controllable by selectively engaging/disengaging the multi-plate clutch 533. When the multi-plate clutch 533 is engaged, the rotation of the first sun gear 525 relative to the first ring gear 531 is prevented. Thus, the first sun gear 525, the first planet carrier 529 and the first ring gear 531 rotate together at the same speed when the multi-plate clutch 533 is engaged. When the multi-plate clutch 533 is dis-engaged, the outer plates 539 of the clutch pack 535 rotate faster than the input drive shaft 513, helping to expel lubricant and, therefore, to lower drag torque of the multi-plate clutch 533.

The operation of the transfer case 507 will now be described with reference to FIGS. 7A and 7B. As shown in FIG. 7A, when the multi-plate clutch 533 is disengaged, the outer plates 537 in the clutch pack 535 are free to rotate relative to the inner plates 538. The first planet carrier 529 is coupled to the input drive shaft 513 and, therefore, rotates at the same speed as the input drive shaft 513. The first ring gear 531 is drivingly de-coupled from the input drive shaft 513 when the multi-plate clutch 533 is disengaged. However, the first sun gear 525 is drivingly rotated by the first planetary gears 527 as the first planet carrier 529 rotates. The first sun gear 525 rotates at a higher speed than the input drive shaft 513. As shown in FIG. 7B, when the multi-plate clutch 533 is engaged, rotation of the outer plates 537 relative to the inner plates 538 is prevented. As outlined above, the first sun gear 525, the first planet carrier 529 and the first ring gear 531 rotate together at the same speed when the multi-plate clutch 533 is engaged. The first ring gear 531 is connected to the transfer sprocket 539 which drives the drive chain 521 and functions as an output from the first epicyclic gear set 523. The direction of output of the first planet carrier 529 matches that of the input drive shaft 513 in the present embodiment.

Figure 8:
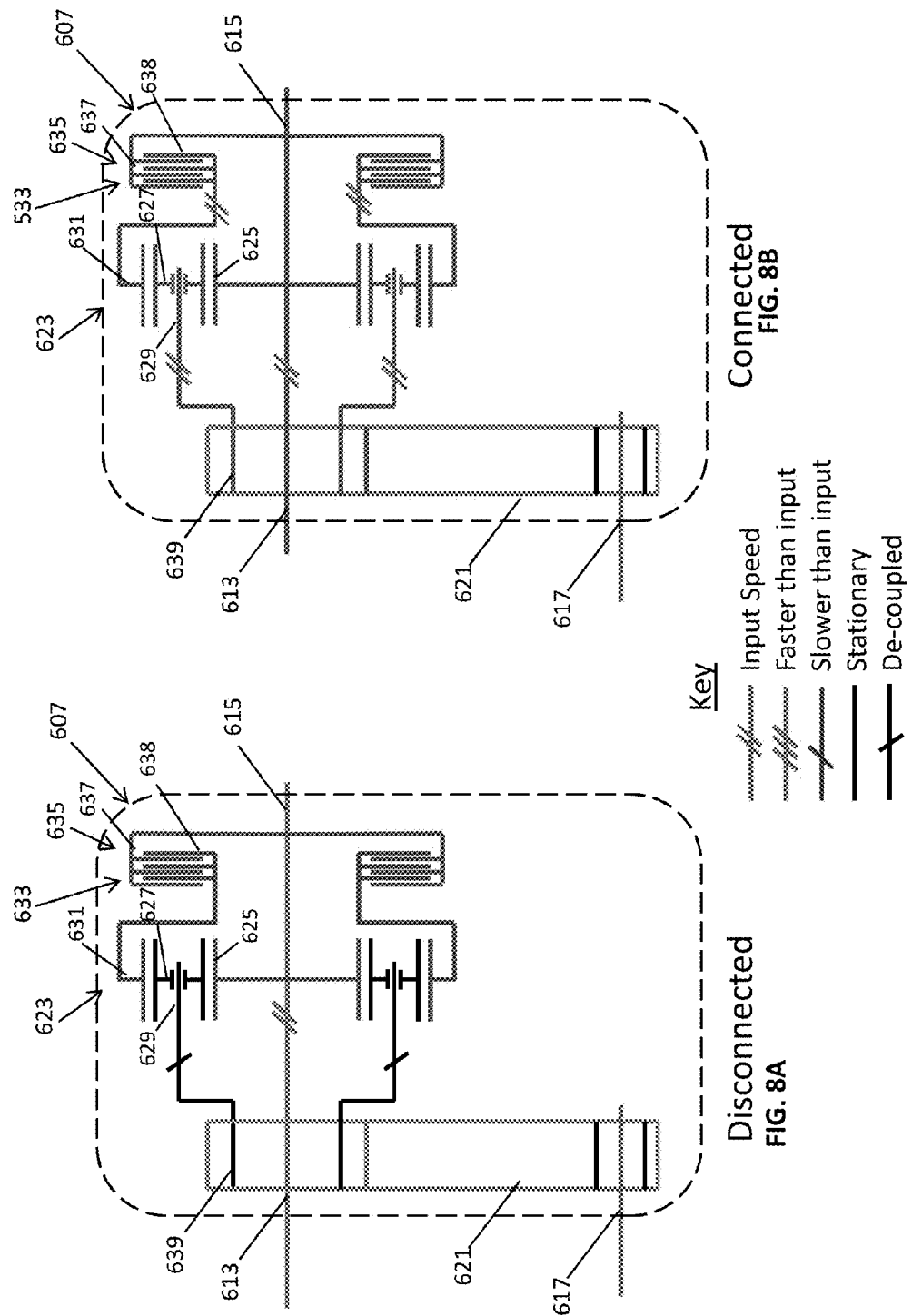
FIGS. 8A and 8B are schematic representations of a transfer case in accordance with a further embodiment of the present invention in respective disconnected and connected configurations.

A further embodiment of a transfer case 607 is shown schematically in FIGS. 8A and 8B. Like reference numerals are used for like components, but increased by 100 for the sake of clarity.

The transfer case 607 comprises a first epicyclic gear set 623 for selectively drivingly coupling a second output drive assembly 617 to an input drive shaft 613. The first epicyclic gear set 623 comprises a first sun gear 625, a plurality of first planetary gears 627, a first planet carrier 629, and a first ring gear 631. The first sun gear 625 meshes with the first planetary gears 625 which are each arranged to mesh with the first ring gear 631. The first planet carrier 627 is rotatably mounted and carries the first planetary gears 6. The gear ratio (R/S) of the first ring gear 631 to the first sun gear 625 is 1.93 in the present embodiment. A first clutch means in the form of a multi-plate clutch 633 is provided to control operation of the first epicyclic gear set 623. The multi-plate clutch 633 is a wet clutch including a clutch pack 635 comprising a plurality of outer plates 637 interspersed between inner plates 638. In the present embodiment, the outer plates 637 and the inner plates 638 are each rotatably mounted. The outer plates 637 and/or the inner plates 638 comprise a friction material. The outer plates 637 and the inner plates 638 are brought together when the multi-plate clutch 633 is engaged to prevent relative rotation therebetween.

In the present embodiment the first sun gear 625 is continuously drivingly coupled to the input drive shaft 613 such that, in use, the first sun gear 625 rotates at the same speed as the input drive shaft 613. The first planet carrier 629 is continuously drivingly coupled to a transfer sprocket 639 arranged to drive the drive chain 621. The input drive shaft 613 is connected to the outer plates 637 and the first ring gear 631 is connected to the inner plates 638. The rotation of the first ring gear 631 is controllable by selectively engaging/disengaging the multi-plate clutch 633. When the multi-plate clutch 633 is engaged, the rotation of the first ring gear 631 relative to the input drive shaft 613 is prevented. Thus, the first sun gear 625, the first planet carrier 629 and the first ring gear 631 rotate together at the same speed when the multi-plate clutch 633 is engaged. When the multi-plate clutch 633 is dis-engaged, the outer plates 637 of the clutch pack 135 rotate slower than the input drive shaft 113.

The operation of the transfer case 607 will now be described with reference to FIGS. 8A and 8B. As shown in FIG. 8A, when the multi-plate clutch 633 is disengaged, the outer plates 637 in the clutch pack 635 are free to rotate relative to the inner plates 638. The first planet carrier 629 is drivingly de-coupled from the input drive shaft 613 when the multi-plate clutch 633 is disengaged. The first planetary gears 627 are drivingly rotated by the first sun gear 625 connected to the input drive shaft 613. The first ring gear 631 is drivingly rotated by the first planetary gears 627 at a lower speed than the input drive shaft 613. As shown in FIG. 8B, when the multi-plate clutch 633 is engaged, rotation of the outer plates 637 relative to the inner plates 638 is prevented. As outlined above, the first sun gear 625, the first planet carrier 629 and the first ring gear 631 rotate together at the same speed when the multi-plate clutch 633 is engaged. The first ring gear 631 is connected to the transfer sprocket 639 which drives the drive chain 621 and functions as an output from the first epicyclic gear set 623. The direction of output of the first planet carrier 629 matches that of the input drive shaft 613 in the present embodiment.

Figure 10:
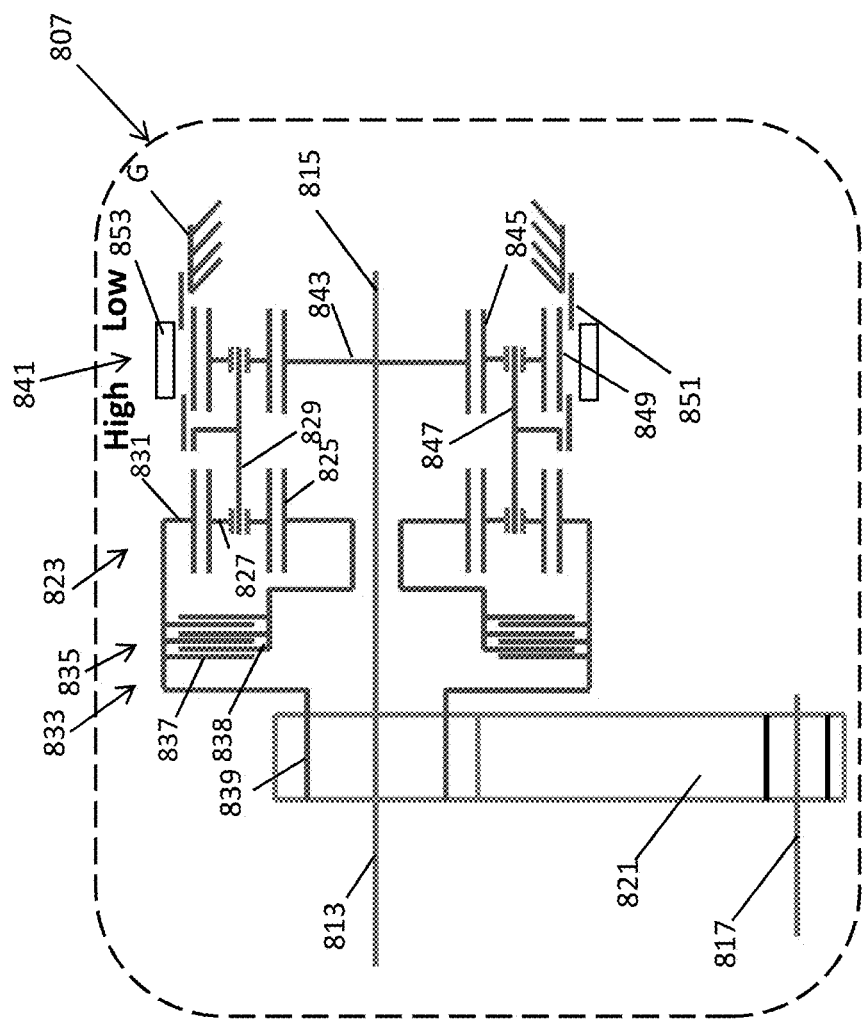
FIG. 10 is a schematic representation of a transfer case in accordance with a further embodiment of the present invention incorporating a high/low range selector.

A further embodiment of a transfer case 707 is shown schematically in FIG. 10. Like reference numerals are used for like components, but increased by 100 for the sake of clarity.

The transfer case 707 comprises a first epicyclic gear set 723 for selectively drivingly coupling a second output drive assembly 717 to an input drive shaft 713. The transfer case 707 also comprises a high/low range selector in the form of a second epicyclic gear set 741. The first epicyclic gear set 723 comprises a first sun gear 725, a plurality of first planetary gears 727, a first planet carrier 729, and a first ring gear 731. The first sun gear 725 meshes with the first planetary gears 727 which are each arranged to mesh with the first ring gear 731. The first planet carrier 729 is rotatably mounted and carries the first planetary gears 727. The gear ratio (R/S) of the first ring gear 731 to the first sun gear 725 is 1.93 in the present embodiment. A first clutch means in the form of a multi-plate clutch 733 is provided to control operation of the first epicyclic gear set 723. The multi-plate clutch 733 is a wet clutch including a clutch pack 735 comprising a plurality of outer plates 737 interspersed between inner plates 738. In the present embodiment, the outer plates 737 and the inner plates 738 are both rotatable. The outer plates 737 and/or the inner plates 738 comprise a friction material. The outer plates 737 and the inner plates 738 are brought together when the multi-plate clutch 733 is engaged to prevent relative rotation therebetween.

In the present embodiment the first planet carrier 729 is continuously drivingly coupled to a transfer case drive shaft 751. The first ring gear 731 is continuously drivingly coupled to a transfer sprocket 739 arranged to drive the drive chain 721. The first ring gear 731 is also connected to the inner plates 738 in the clutch pack 735. The first sun gear 725 is connected to the outer plates 737 in the clutch pack 735. The rotation of the first ring gear 731 is controllable by selectively engaging/disengaging the multi-plate clutch 733. When the multi-plate clutch 733 is engaged, the rotation of the first sun gear 725 relative to the first ring gear 731 is prevented. Thus, the first sun gear 725, the first planet carrier 729 and the first ring gear 731 rotate together at the same speed when the multi-plate clutch 733 is engaged.

The second epicyclic gear set 741 comprises a second sun gear 743, a plurality of second planetary gears 745, a second planet carrier 747, and a second ring gear 749. The second sun gear 743 meshes with the second planetary gears 745 which are each arranged to mesh with the second ring gear 749. The second sun gear 743 is continuously drivingly coupled to the input drive shaft 713 which is connected to the output from the gearbox. The second planet carrier 747 carries the second planetary gears 745. In this embodiment, the second planet carrier 747 is continuously drivingly coupled to the transfer case drive shaft 751 which provides an input to the first epicyclic gear set 723. A second clutch means in the form of a range collar 753 is provided to control operation of the second epicyclic gear set 741 to selectively engage either a high transmission range or a low transmission range. The range collar 753 is movable to drivingly connect the second ring gear 749 to either the second planet carrier 747 or to a fixed ground. A synchronizer can be provided to synchronize the rotational speed of the second ring gear 749. When connected to the fixed ground G, the rotation of the second ring gear 749 is prevented and the transfer case 707 operates in a Low range. When connected to the second planet carrier, the second ring gear 749 rotates with the second planet carrier 747 and the transfer case 707 operates in a High range. The fixed ground is typically a housing of the transfer case 707. A lever and a drive motor (not shown) are provided to actuate the range collar 753.

Figure 9:
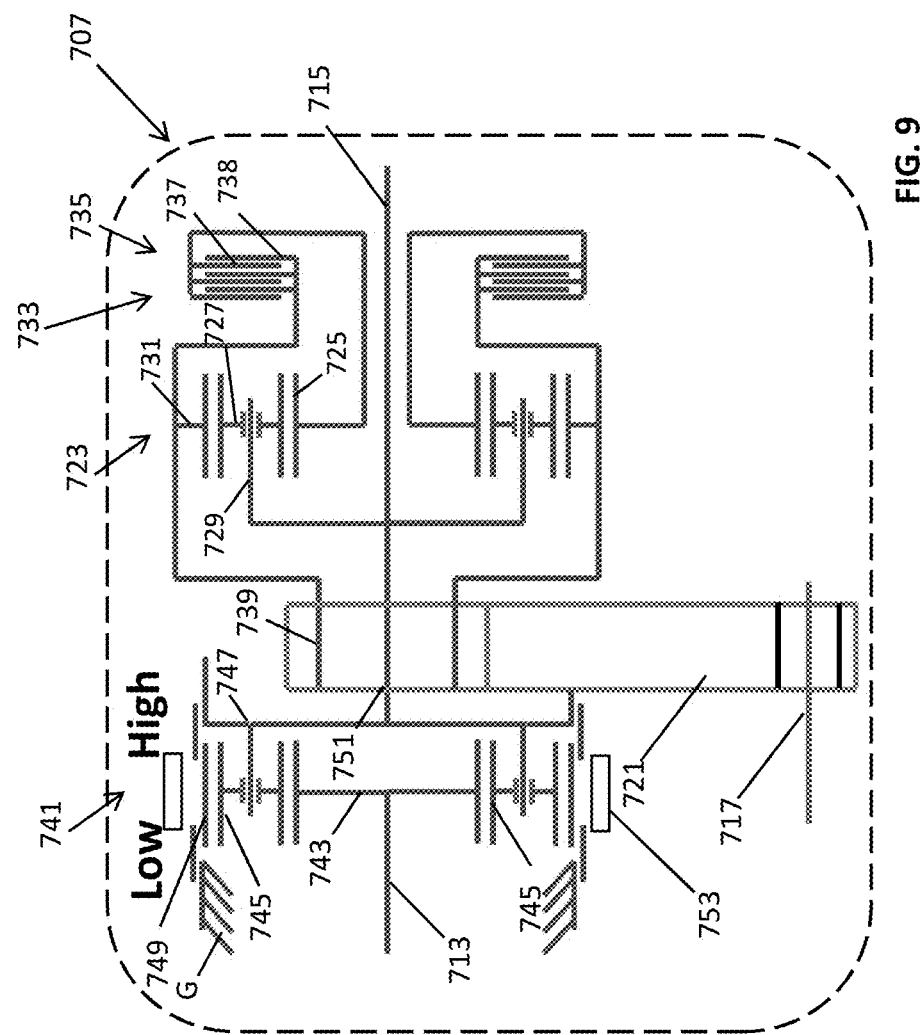
FIG. 9 is a schematic representation of a transfer case in accordance with a further embodiment of the present invention incorporating a high/low range selector.

The operation of the transfer case 707 will now be described with reference to FIG. 9. The range collar 753 is actuated to select the High range or the Low range for the transfer case 707. When the second ring gear 749 is connected to the second planet carrier 747, the transfer case 707 operates in a High range; and when the second ring gear 749 is connected to the fixed ground G, the transfer case 707 operates in a Low range. The second planet carrier 747 is connected to the transfer case drive shaft 751 and, therefore, the selected range determines the input speed to the first epicyclic gear set 723.

When the multi-plate clutch 733 is disengaged, the outer plates 737 in the clutch pack 735 are free to rotate relative to the inner plates 738. The first planet carrier 729 is coupled to the transfer case drive shaft 751 and, therefore, rotates at the same speed as the transfer case drive shaft 751. The first ring gear 731 is drivingly de-coupled from the transfer case drive shaft 751 when the multi-plate clutch 733 is disengaged. However, the sun gear 725 is drivingly rotated by the first planetary gears 727 as the first planet carrier 729 rotates. The sun gear 725 rotates at a higher speed than the transfer case drive shaft 751. When the multi-plate clutch 733 is engaged, rotation of the outer plates 737 relative to the inner plates 738 is prevented. The first sun gear 725, the first planet carrier 729 and the first ring gear 731 rotate together at the same speed when the multi-plate clutch 733 is engaged. The first ring gear 731 is connected to the transfer sprocket 739 which drives the drive chain 721 and functions as an output from the first epicyclic gear set 723. The direction of output of the first planet carrier 729 matches that of the input drive shaft 713 in the present embodiment.

A further embodiment of a transfer case 807 is shown schematically in FIG. 10. Like reference numerals are used for like components, but increased by 100 for the sake of clarity.

The transfer case 807 comprises a first epicyclic gear set 823 for selectively drivingly coupling a second output drive assembly 817 to an input drive shaft 813. The transfer case 807 also comprises a high/low range selector in the form of a second epicyclic gear set 841. The first epicyclic gear set 823 comprises a first sun gear 825, a plurality of first planetary gears 827, a first planet carrier 829, and a first ring gear 831. The first sun gear 825 meshes with the first planetary gears 827 which are each arranged to mesh with the first ring gear 831. The first planet carrier 829 is rotatably mounted and carries the first planetary gears 827. The gear ratio (R/S) of the first ring gear 831 to the first sun gear 825 is 1.93 in the present embodiment. A first clutch means in the form of a multi-plate clutch 833 is provided to control operation of the first epicyclic gear set 823. The multi-plate clutch 833 is a wet clutch including a clutch pack 835 comprising a plurality of outer plates 837 interspersed between inner plates 838. In the present embodiment, the outer plates 837 and the inner plates 838 are both rotatable. The outer plates 837 and/or the inner plates 838 comprise a friction material. The outer plates 837 and the inner plates 838 are brought together when the multi-plate clutch 833 is engaged to prevent relative rotation therebetween.

The second epicyclic gear set 841 comprises a second sun gear 843, a plurality of second planetary gears 845, a second planet carrier 847, and a second ring gear 849. The second sun gear 843 meshes with the second planetary gears 845 which are each arranged to mesh with the second ring gear 849. The second sun gear 843 is continuously drivingly coupled to the input drive shaft 813 which is connected to the output shaft from the gearbox. The second planet carrier 847 carries the second planetary gears 845. In this embodiment, the second planet carrier 847 is continuously drivingly coupled to the first planet carrier 829. A second clutch means in the form of a range collar 853 is provided to control operation of the second epicyclic gear set 841 to selectively engage either a high transmission range or a low transmission range. The range collar 853 is movable to drivingly connect the second ring gear 849 to either the second planet carrier 847 or to a fixed ground G. A synchronizer can be provided to synchronize the rotational speed of the second ring gear 849. When connected to the fixed ground G, the rotation of the second ring gear 849 is prevented and the transfer case 807 operates in a Low range. When connected to the second planet carrier, the second ring gear 849 rotates with the second planet carrier 847 and the transfer case 807 operates in a High range. The fixed ground G is typically a housing of the transfer case 807. A lever and a drive motor (not shown) are provided to actuate the range collar 853.

As outlined above, the first planet carrier 829 is continuously drivingly coupled to the second planet carrier 847. The first ring gear 831 is continuously drivingly coupled to a transfer sprocket 839 arranged to drive the drive chain 821. The first sun gear 825 is connected to the inner plates 838 of the clutch pack 835; and the first ring gear 831 is connected to the outer plates 837 of the clutch pack 835. The rotation of the first ring gear 831 is controllable by selectively engaging/disengaging the multi-plate clutch 833. When the multi-plate clutch 833 is engaged, the rotation of the first sun gear 825 relative to the first ring gear 831 is prevented. Thus, the first sun gear 825, the first planet carrier 829 and the first ring gear 831 rotate together at the same speed when the multi-plate clutch 833 is engaged.

The operation of the transfer case 807 will now be described with reference to FIG. 10. The range collar 853 is actuated to select the High range or the Low range for the transfer case 807. When the second ring gear 849 is connected to the second planet carrier 847, the transfer case 807 operates in a High range; and when the second ring gear 849 is connected to the fixed ground G, the transfer case 807 operates in a Low range. The second planet carrier 847 is connected to the first planet carrier 829 and, therefore, the selected range determines the input speed to the first epicyclic gear set 823.

When the multi-plate clutch 833 is disengaged, the outer plates 837 in the clutch pack 835 are free to rotate relative to the inner plates 838. The first planet carrier 829 is continuously drivingly coupled to the second planet carrier 847. The first ring gear 831 is drivingly de-coupled from the input drive shaft 813 when the multi-plate clutch 833 is disengaged. However, the first sun gear 825 is drivingly rotated by the first planetary gears 827 as the first planet carrier 829 rotates causing the first sun gear 825 to rotate at a higher speed than the planet carrier 829. When the multi-plate clutch 833 is engaged, rotation of the outer plates 837 relative to the inner plates 838 is prevented. The first sun gear 825, the first planet carrier 829 and the first ring gear 831 rotate together at the same speed when the multi-plate clutch 833 is engaged. The first ring gear 831 is continuously drivingly coupled to the transfer sprocket 839 which drives the drive chain 821 and functions as an output from the first epicyclic gear set 823. The direction of output of the first planet carrier 829 matches that of the input drive shaft 813 in the present embodiment.

It will be appreciated that various changes and modifications can be made to the transfer case described herein without departing from the scope of the present application. The transfer case 107; 207; 307; 407; 507; 707; 807 has been described with reference to application in a driveline 101 connected to an internal combustion engine 103 arranged in a longitudinal (North South) configuration. The transfer case 107; 207; 307; 407; 507; 607; 707; 807 could also be used in combination with an internal combustion engine 103 arranged in a transverse (East West) configuration. The driveline 101 can be configured to drive the front wheels $W_F$ and to selectively drive the rear wheels $W_F$. The driveline 101 can optionally include a driveline disconnect for disconnecting the main drive shaft 109 or the auxiliary drive shaft 111. The driveline disconnect can, for example, comprise a clutch mechanism, such as a dog clutch or a multi-plate clutch. It will be appreciated that further changes and modification can be made to the transfer case 107; 207; 307; 407; 507; 607; 707; 807 described herein.

The rotational directions of the first and second output drive assemblies are matched in the embodiments described herein. In alternate configurations, the rotational direction of the first and second output drive assemblies can be reversed. One or more gears can be incorporated into the transfer case 107; 207; 307; 407; 507; 607; 707; 807 to reverse the second output drive assembly. Alternatively, or in addition, one or more gears can be provided to match the output speed of the first and second output drive assemblies.

Further aspects of the present invention are set out in the following series of numbered paragraphs:

1. A transfer case for a vehicle driveline, the transfer case comprising:
    a first input drive means;
    a first output drive means;
    a second output drive means;
    a first epicyclic gear set comprising a first sun gear, a plurality of first planetary gears, a first planet carrier, and a first ring gear; and
    a first clutch means configured to control the first epicyclic gear set;
    wherein the first output drive means is continuously drivingly coupled to the first input drive means; and the first clutch means selectively drivingly couples the second output drive means to the first input drive means.

2. A transfer case as described in paragraph 1, wherein, when the first clutch means is engaged, the first epicyclic gear set drivingly couples the second output shaft to the input shaft; and, when the first clutch means is dis-engaged, the first epicyclic gear set drivingly de-couples the second output shaft from the input shaft.

3. A transfer case as described in paragraph 1 or paragraph 2, wherein the first clutch means is configured to selectively engage the first sun gear or the first planet carrier or the first ring gear to prevent rotation.

4. A transfer case as described in paragraph 3, wherein the first clutch means is configured to:

(a) drivingly couple the first sun gear to the first planet carrier; or
(b) drivingly couple the first sun gear to the first ring gear; or
(c) drivingly couple the first ring gear to the first planet carrier.

5. A transfer case as described in any one paragraphs 1 to 4, wherein the first planet carrier is coupled to the first input drive means and the first ring gear is coupled to the second output drive means, wherein the first clutch means is configured to releasably engage the first sun gear.

6. A transfer case as described in any one of paragraphs 1 to 4, wherein the first planet carrier is coupled to the second output drive means and the first ring gear is coupled to the first input drive means, wherein the first clutch means is configured to releasably engage the first sun gear.

7. A transfer case as described in any one of paragraphs 1 to 4, wherein the first sun gear is coupled to the first input drive means and the first planet carrier is coupled to the second output drive means, wherein the first clutch means is configured to releasably engage the first ring gear.

8. A transfer case as described in any one of paragraphs 1 to 4, wherein the first planet carrier is coupled to the first input drive means and the first ring gear is coupled to the second output drive means, wherein the first clutch means is configured to releasably couple the first sun gear to the first planet carrier.

9. A transfer case as described in any one of paragraphs 1 to 4, wherein the first planet carrier is coupled to the first input drive means and the first ring gear is coupled to the second output drive means, wherein the first clutch means is configured to releasably couple the first sun gear to the first ring gear.

10. A transfer case as described in any one of paragraphs 1 to 4, wherein the sun gear is coupled to the first input drive means and the planetary gear is coupled to the second output drive means, wherein the first clutch means is configured to releasably couple the first ring gear to the first input drive means.

11. A transfer case as described in any one of the preceding paragraphs comprising a second epicyclic gear set comprising a second sun gear, a plurality of second planetary gears, a second planet carrier, and a second ring gear; the transfer case comprising a second clutch means for controlling operation of the second epicyclic gear set to selectively engage either a high range or a low range.

12. A transfer case as described in paragraph 11, wherein the second sun gear is coupled to the first input drive means, and the second planet carrier is coupled to the first planet carrier; and the second clutch means is configured to selectively couple the second ring gear to either the second planet carrier or to a fixed ground.

13. A transfer case as described in paragraph 12, wherein the first and second planetary gears are mounted on common pinion pins.

14. A vehicle driveline comprising a transfer case as described in any one of the preceding paragraphs.

15. A vehicle driveline as described in paragraph 14, wherein the first output drive means is connected to a first drive shaft and the second output drive means is connected to a second drive shaft.

16. A vehicle driveline as described in paragraph 14 or paragraph 15 comprising a driveline disconnect for disconnecting a portion of the vehicle driveline.

17. A vehicle driveline as described in paragraph 16, wherein the driveline disconnect is operable selectively to disconnect a drive shaft coupled to the second output drive means.

18. A vehicle driveline as described in paragraph 16 or paragraph 17, wherein the driveline disconnect means comprises a second clutch means.

19. A vehicle comprising a transfer case as described in any one of paragraphs 1 to 13.

20. A vehicle as described in paragraph 19 comprising a torque-generating apparatus, at least one front wheel and at least one rear wheel; the first output drive means being configured to drivingly couple the torque-generating apparatus to the at least one front wheel or to the at least one rear wheel; wherein the first clutch means is configured selectively to drivingly couple the other of said at least one front wheel and said at least one rear wheel to the torque-generating apparatus.

The invention claimed is:

1. A transfer case for a vehicle driveline, the transfer case comprising:
   a first input drive;
   a first output drive;
   a second output drive;
   a first epicyclic gear set comprising a first sun gear, a plurality of first planetary gears, a first planet carrier, and a first ring gear,
   wherein the first output drive is continuously drivingly coupled to the first input drive; and
   a first clutch configured to control the first epicyclic gear set to selectively drivingly couple and de-couple the second output drive and the first input drive thereby to enable the transfer case to selectively disconnect a portion of the vehicle driveline that is coupled to the second output drive.

2. The transfer case as claimed in claim 1, wherein, when the first clutch is engaged, the first epicyclic gear set drivingly couples the second output shaft to the input shaft; and, when the first clutch is dis-engaged, the first epicyclic gear set drivingly de-couples the second output shaft from the input shaft.

3. The transfer case as claimed in claim 1, wherein the first planet carrier is coupled to the first input drive and the first ring gear is coupled to the second output drive, wherein the first clutch is configured to releasably engage the first sun gear.

4. The transfer case as claimed in claim 1, wherein the first planet carrier is coupled to the second output drive and the first ring gear is coupled to the first input drive, wherein the first clutch is configured to releasably engage the first sun gear.

5. The transfer case as claimed in claim 1, wherein the first sun gear is coupled to the first input drive and the first planet carrier is coupled to the second output drive, wherein the first clutch is configured to releasably engage the first ring gear.

6. The transfer case as claimed in claim 1, wherein the first planet carrier is coupled to the first input drive and the first ring gear is coupled to the second output drive, wherein the first clutch is configured to releasably couple the first sun gear to the first planet carrier.

7. The transfer case as claimed in claim 1, wherein the first planet carrier is coupled to the first input drive and the first ring gear is coupled to the second output drive, wherein the first clutch is configured to releasably couple the first sun gear to the first ring gear.

8. The transfer case as claimed in claim 1, wherein the first sun gear is coupled to the first input drive and at least one of the plurality of first planetary gears is coupled to the second output drive, wherein the first clutch is configured to releasably couple the first ring gear to the first input drive means.

9. The transfer case as claimed in claim 1 comprising a second epicyclic gear set comprising a second sun gear, a plurality of second planetary gears, a second planet carrier, and a second ring gear; the transfer case comprising a second clutch for controlling operation of the second epicyclic gear set to selectively engage either a high range or a low range.

10. The transfer case as claimed in claim 9, wherein the second sun gear is coupled to the first input drive, and the second planet carrier is coupled to the first planet carrier; and the second clutch is configured to selectively couple the second ring gear to either the second planet carrier or to a fixed ground.

11. The transfer case as claimed in claim 10, wherein the first and second planetary gears are mounted on common pinion pins.

12. A vehicle driveline comprising a transfer case including:
- a first input drive;
- a first output drive continuously drivingly coupled to the first input drive;
- a second output drive;
- a first epicyclic gear set comprising a first sun gear, a plurality of first planetary gears, a first planet carrier, and a first ring gear; and
- a first clutch configured to control the first epicyclic gear set to selectively drivingly couple and de-couple the second output drive and the first input drive thereby to enable the transfer case to selectively disconnect a portion of the vehicle driveline that is coupled to the second output drive.

13. The vehicle driveline as claimed in claim 12, comprising a first drive shaft and a second drive shaft, and wherein the first output drive of the transfer case is connected to the first drive shaft and the second output drive of the transfer case is connected to the second drive shaft.

14. The vehicle driveline as claimed in claim 12 further comprising a driveline disconnect device for disconnecting the portion of the vehicle driveline.

15. The vehicle driveline as claimed in claim 14, wherein the driveline disconnect device is operable selectively to disconnect a drive shaft coupled to the second output drive.

16. The vehicle driveline as claimed in claim 14, wherein the driveline disconnect device comprises a second clutch.

17. A vehicle comprising a transfer case including:
- a first input drive;
- a first output drive continuously drivingly coupled to the first input drive;
- a second output drive;
- a first epicyclic gear set comprising a first sun gear, a plurality of first planetary gears, a first planet carrier, and a first ring gear; and
- a first clutch configured to control the first epicyclic gear set to selectively drivingly couple and de-couple the second output drive and the first input drive thereby to enable the transfer case to selectively disconnect a portion of the vehicle driveline that is coupled to the second output drive.

18. The vehicle as claimed in claim 17 comprising a torque-generating apparatus, at least one front wheel and at least one rear wheel; the first output drive being configured to drivingly couple the torque-generating apparatus to one of the at least one front wheel and the at least one rear wheel; wherein the first clutch is configured selectively to drivingly couple the other of said at least one front wheel and said at least one rear wheel to the torque-generating apparatus.

* * * * *